United States Patent [19]

McCoy

[11] Patent Number: 5,638,042

[45] Date of Patent: Jun. 10, 1997

[54] MAGNETIC APPARATUS FOR EXTENDING THE LIFE OF BLADE CUTTING EDGES

[76] Inventor: Charles B. McCoy, 242 County Fair Dr., Houston, Tex. 77060

[21] Appl. No.: 503,556

[22] Filed: Oct. 25, 1995

[51] Int. Cl.$^6$ ............................................. H01F 7/02
[52] U.S. Cl. ........................................... 335/306; 30/74
[58] Field of Search .......................... 335/301–306; 30/74; 83/331

[56] References Cited

U.S. PATENT DOCUMENTS

| | | |
|---|---|---|
| 1,495,921 | 5/1924 | Moulton . |
| 1,529,316 | 3/1925 | Lovegrove . |
| 1,775,518 | 9/1930 | Forbes . |
| 1,782,033 | 11/1930 | Forbes . |
| 1,914,925 | 6/1933 | Nones . |
| 2,792,108 | 5/1957 | Keller . |
| 3,031,757 | 5/1962 | Kiamer . |
| 3,918,339 | 11/1975 | Cailloux ........................ 83/611 |
| 4,205,571 | 6/1980 | Bertini ........................... 83/661 |
| 5,329,699 | 7/1994 | McCoy ........................... 30/74 |
| 5,445,561 | 8/1995 | Elmer ............................. 83/611 |

FOREIGN PATENT DOCUMENTS 757926  10/1956  United Kingdom .

OTHER PUBLICATIONS

Title: Magnetism – An Introductory Survey, Author: E.W. Lee, Publisher: Dover Publications, Inc., pp. 51,81,83,84, 90,94,104–105,131,183,219–221.

Primary Examiner—Lincoln Donovan

[57] ABSTRACT

A method and apparatus for extending the life of blade cutting edges comprising a unit having at least two oppositely charged permanent magnet polar surfaces which pass strong magnetic lines of force directly into the blade cutting edge from close proximity opposite polarity magnet polar surfaces aligned in a polarized configuration unit so that the coinciding lines of force pass through the cutting edge and turn into the blade.

23 Claims, 7 Drawing Sheets

MAGNETIC APPARATUS FOR EXTENDING THE LIFE OF BLADE CUTTING EDGES

BACKGROUND OF THE INVENTION

Blade cutting edges used in machinery, hand tools and shaving devices have a common problem of maintaining a sharp edge. This problem comprises corrosion damage caused by harsh environmental working conditions. Blade cutting edge corrosion occurs when free electrons from the metal cutting edge flow across a boundary into a contacting layer of moisture. Blade cutting edges comprise metal material conductors with large numbers of these free electrons. Free electrons comprise mobile electrons and are not to be confused with planetary electrons. Planetary electrons are held within the atom by strong electrostatic forces while free electrons move randomly within the conductor. This random movement causes collisions with atoms that is how electrical energy is transmitted through a metallic conductor causing corrosion.

Corrosion comprises the electrochemical attack of a metal surface that occurs in the presence of water and oxygen. Blade cutting edge corrosion comprises wet corrosion that begins in the form of rusting. Rusting occurs when aqueous solutions are allowed to remain on unprotected areas of a blade cutting edge surface. Blades comprise sharp cutting edges and free electrons accumulate along these sharp edges. Different parts of the cutting edge surface accumulate more electrons than others and act like electrodes. This electrode like action begins to release free electrons from the cutting edge thereby forming metallic ions. These metallic ions are then absorbed by ions in the electrolyte water solution. This metallic ion absorption by ions in the electrolyte solution causes the dissolution of the metal cutting edge. Dissolution comprises the taking up of a substance by a liquid. This dissolution process begins at the free electron discharge points. The process of dissolution causes small metal particles to break off the blades fine cutting edge forming pits. Loss of these small particles allows the electrolyte water solution to penetrate the metal cutting edge and increases the rate of dissolution. This dissolution causes a condition known as accelerated pitting. As the pitting increases, larger particles begin to break off the fine cutting edge causing corrosion pitting damage. This corrosion pitting damage changes the blade's sharp cutting edge into a jagged irregular dull edge surface. This corrosion pitting damage is one of the most difficult types of corrosion to prevent.

The problem of corrosion rusting and pitting has changed the way blade cutting edges are manufactured. The long utilized high carbon steels used in the manufacturing of blade cutting edges are easily damaged by corrosion. To find a corrosion free blade cutting edge material, corrosion resistant stainless steel alloy blades were developed. Stainless steel alloys, while somewhat resistant to corrosion, do not maintain as sharp a blade cutting edge as high carbon steels. Carbide tip blade cutting edges advanced the fight against corrosion damage; however, unlike stainless steel and carbon steel, carbide tip blades are costly, brittle and require specialized equipment to sharpen the cutting edge. This prevents carbide tip blades from being sharpened in the field which is a significant problem. Cutting tools used in forestry operations, lumber mills and remote locations use carbon steel blade cutting edges due to their economical price and ease of on-site sharpening.

Another advance in the fight against blade cutting edge corrosion was the development of specialized coatings. Blade cutting edges often have sprayed on protective metal films and plastic coatings to prevent corrosion damage; however, these films and coatings are destroyed during the first use of the blade cutting edges. This destruction of the protective coating leaves the blade cutting edges open to electrochemical corrosion attack in the form rusting and pitting damage.

SUMMARY OF THE INVENTION

The inventor has overcome the problem of blade cutting edge corrosion by the development of a permanent magnetic field saturation action. This permanent magnetic field saturation action embodiment comprises a permanent magnet polarized configuration embodiment used to form a protective magnetic field energy barrier around a blade cutting edge. This protective magnetic field energy barrier embodiment prevents blade cutting edge corrosion by reducing molecular disturbances within the blade cutting edge, by removing corrosive solutions from the blade cutting edge in a dehydration action and by neutralizing the electrochemical corrosion attack process.

The inventor has determined that the sharp edges of blade cutting edges can be protected from corrosion damage by subjecting the blade's cutting edge to a permanent magnetic field saturation action.

Accordingly, it is an object of the invention to provide a permanent magnet apparatus that prevents corrosion rusting and pitting damage to blade cutting edges.

Another object is to provide an apparatus that can accommodate any shape and size blade cutting edge.

Another object is to provide an apparatus that is inexpensive and easy to manufacture.

Another object of this invention is to provide an apparatus that is safe for the consumer to use and has a very long life span.

Another object of the invention is to provide an apparatus that uses the permanent magnetic field saturation action of the present invention.

Another object of the invention is to provide a shaving apparatus that uses the permanent magnetic field saturation action of the present invention.

Another object of the invention is to greatly extend the life of blade cutting edges and provide an economical benefit to the consumer.

DETAILED DESCRIPTION AND SPECIFICATIONS OF THE PREFERRED EMBODIMENTS

Figure 3:
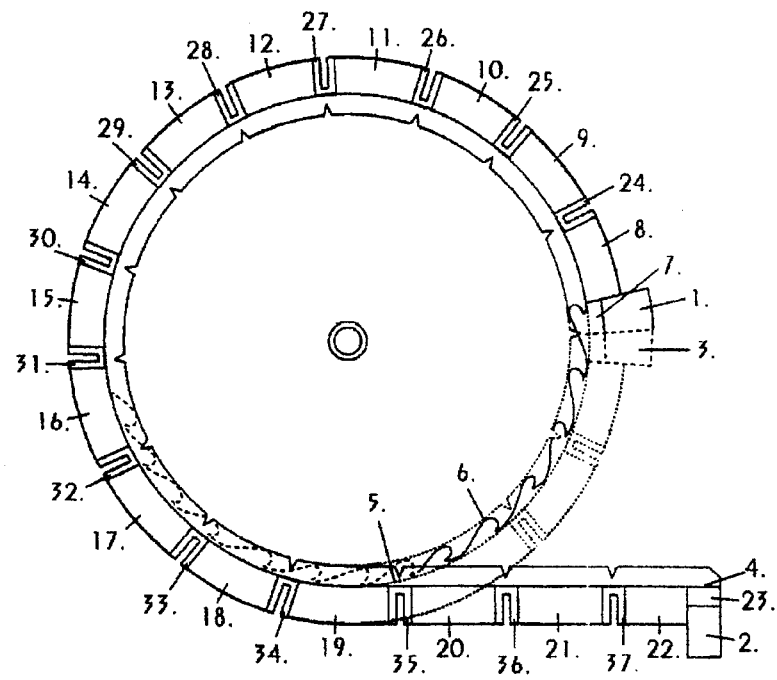
FIG. 3 is a side view in outline and hidden line perspective of the preferred embodiments of the invention in use with a circular saw blade.
Figure 7:
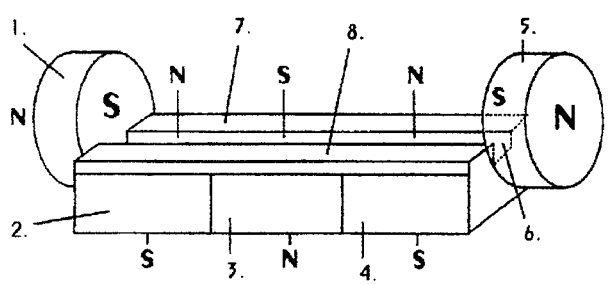
FIG. 7 is a diagonal front view of the invention's receiving cradle embodiment attached to the polarized configuration preferred embodiments.

A detailed description of the invention's permanent magnetic field saturation action embodiment is now required. This permanent magnetic field saturation action comprises permanent magnet embodiments arranged in novel polarized configurations, see FIG. 1 and FIG. 7. The permanent magnet embodiments comprise permanent magnets that are magnetized on their largest dimension. Permanent magnets magnetized on their largest dimension comprise magnets having a North Pole embodiment and a South Pole embodiment. Magnetic pole embodiments are designated as North Pole by the letter N and South Pole by the letter S. North Pole embodiments and South Pole embodiments comprise magnetic poles of opposite polarity magnetic field. Magnetic pole embodiments having oppositely charged magnetic polar fields attract each other. The invention's polarized configuration embodiments comprise multiple permanent magnet embodiments attached together by this magnetic attraction embodiment to form a powerful protective magnetic field energy barrier embodiment around a blade cutting edge. The polarized configuration embodiment's permanent magnet embodiments form a receptacle comprising a receiving cradle embodiment, see FIG. 8 element 2. The receiving cradle embodiment comprises an open placement area for blade cutting edges undergoing the invention's permanent magnetic field saturation action embodiment. The receiving cradle embodiment has the strongest polar magnetic field embodiment of the invention's permanent magnetic field saturation action embodiment. The polarized configuration embodiment comprises permanent magnet embodiments in rigid and flexible apparatus. The rigid polarized configuration embodiment is illustrated in FIG. 7. The flexible polarized configuration embodiment is illustrated in FIG. 3.

An explanation of magnetic fields is now required. Magnetic fields comprise the invisible force fields that surround a magnet. Magnetic pole embodiments comprise the beginning and ending points for the magnetic field embodiments. Magnetic field embodiments are similar to electric fields in that they follow the path of least opposition to flow. Magnetic field embodiments move out at a right angle from the North Pole embodiment and in at a right angle to the South Pole embodiment.

As referenced above, the electrochemical corrosion process occurs in the presence of water and oxygen. When water and oxygen contact a blade cutting edge it is in the form of an electrolyte solution. Electrolytes conduct electricity and their presence on the blade cutting edges cause electrochemical corrosion damage. The water in the electrolyte solution is diamagnetic and diamagnetic substances are repelled from the blade cutting edge by the invention's permanent magnetic field saturation action embodiment. The invention's dehydration action embodiment prevents the occurrence of blade cutting edge corrosion damage by removing the electrolyte solution from the blade cutting edge.

The invention's permanent magnetic field saturation action comprises a repelling action embodiment against free electrons and metallic ions on the blade cutting edge. This repelling action prevents electrolyte solutions from absorbing free electrons and metallic ions from the blade cutting edge which is how the electrochemical corrosion damage process begins.

The permanent magnetic field saturation action comprises an embodiment that reduces molecular disturbances within the blade cutting edge. This reduction of molecular disturbance within the blade halts the random flow of free electrons within the blade cutting edge. Halting this random flow of free electrons prevents electrical energy from flowing to the blade cutting edge. The influence of the permanent magnetic field saturation action on the blade cutting edge causes cutting edge free electrons to travel in a circular path between collisions with atoms as they move through the blade. Free electrons traveling in a circular path are equivalent to a current flowing in a circular wire with a magnetic moment. This free electron flow in the blade is now in opposition to the receiving cradle embodiment's induced permanent magnetic field saturation action embodiment.

This effect is known as diamagnetism and was first used by Michael Faraday in 1845. A strong outside magnetic field slows down and speeds up the free electron spin in a manner that the free electron flow in a conductor opposes the action of the outside magnetic field. The blade cutting edge free electrons are forced to stay within the blade but are repelled away from the blade's cutting edge area by the permanent magnetic field saturation action of the invention. Halting the loss of blade cutting edge free electrons and metallic ions into a contacting electrolyte solution neutralizes the electrochemical corrosion process and protects the blade cutting edge against corrosion rusting and pitting damage.

An alternate embodiment of the invention's permanent magnetic field saturation action comprises a magnetic razor blade with a corrosion free magnetic pole blade cutting edge embodiment. The magnetic razor blade embodiment, FIG. 9, element 1, comprises ferromagnetic steel formed into a thin flexible rectangular sheet having at least one magnetic pole blade cutting edge embodiment, FIG. 9, element 2. The magnetic razor blade embodiment comprises two opposite polarity magnetic pole embodiments, FIG. 9, element 2 and element 3, with only one magnetic pole embodiment per dimension. The magnetic pole blade cutting edge embodiment comprises a sharpened area, FIG. 9, element 2, along the narrow longitudinal edge of the razor blade embodiment and is used to shave hair from the skin surface. The magnetic pole blade cutting edge embodiment comprises a magnetic repelling embodiment that prevents the loss of blade cutting edge free electrons into contacting electrolyte solutions thereby neutralizing electrochemical corrosion damage to the blade cutting edge embodiment.

Figure 10:
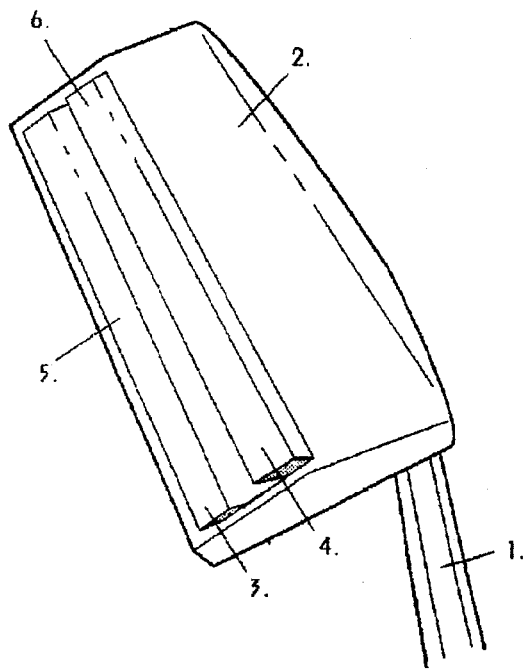
FIG. 10 is a diagonal top view of a conventional safety razor shaving head.

The invention's magnetic razor blade embodiment provides the best quality shaving results when used in a conventional twin blade safety razor design, FIG. 10, illustrates a twin blade safety razor comprising a slender grip handle, element 1, attached to a shaving head, element 2. The shaving head embodiment comprises two magnetic razor blade embodiments, element 3 and element 4 with exposed magnetic pole blade cutting edge embodiments, element 5 and element 6. This twin blade shaving head design comprises a beneficial magnetic keeper embodiment, FIG. 10, element 9, that prevents demagnetization of the magnetic pole blade cutting edges embodiment. Demagnetization of magnetic blade cutting edges occurs when opposite magnetic poles appear at separate ends of the magnetic blade cutting edge. Demagnetization is caused by an area of zero magnetism in the magnetic blade cutting edge. This area is known as the demagnetizing field and is the direct center between two opposite magnetic poles of the same permanent magnet. This direct center area is known as the Block Wall point of zero magnetism. Magnetic blade cutting edges suffer high levels of corrosion damage in this area of demagnetization. The invention's magnetic pole blade cutting edge embodiment prevents electrochemical corrosion damage by avoiding demagnetizing fields.

Figure 11:
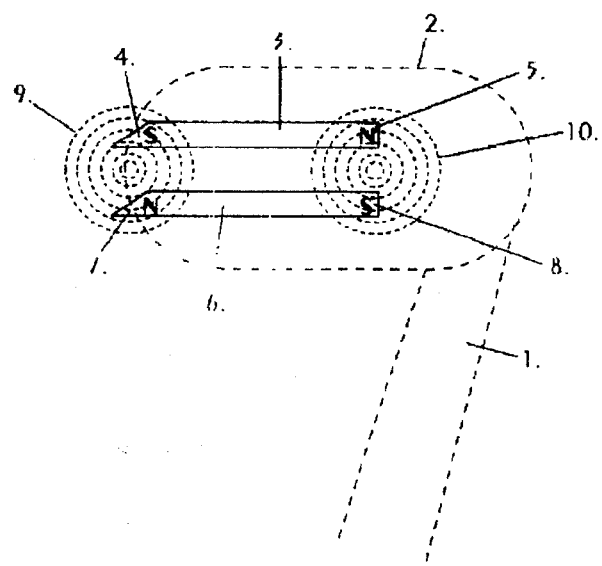
FIG. 11 is a side view in hidden line perspective of the invention's magnetic keeper preferred embodiments.

FIG. 11 illustrates the invention's magnetic keeper embodiment. The magnetic keeper embodiment comprises an invisible magnetic field circuit which flows between opposite polarity magnetic pole embodiments of two separate magnetic razor blade embodiments. This twin magnetic razor blade design comprises two magnetic keeper embodiments, element 9 and element 10. Element 9 comprises the magnetic keeper embodiment flowing between the two exposed magnetic pole blade cutting edge embodiments, element 4 and element 7. The directional arrows illustrate the magnetic keeper embodiment's circular magnetic field circuit embodiment flowing between the two magnetic razor blade embodiments opposite polarity magnetic pole embodiment.

Figure 1:
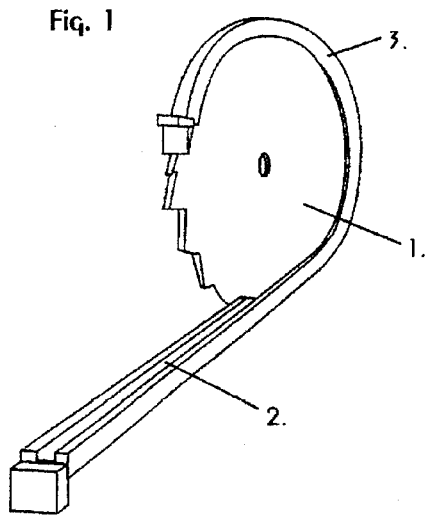
FIG. 1 is a diagonal pictorial view of the preferred embodiment of the invention in use with a circular saw blade.

FIG. 1 illustrates a diagonal view of an alternate flexible embodiment of the invention's permanent magnet polarized configuration embodiment which is attached to a circular saw blade, element 1. Element 2 illustrates the receiving cradle embodiment that encloses the saw blade cutting edges. Element 3 comprises the insulated housing embodiment containing the permanent magnet polarized configuration embodiment. This polarized configuration embodiment is outlined in detail in FIG. 3, elements 1 through element 37.

Figure 2:
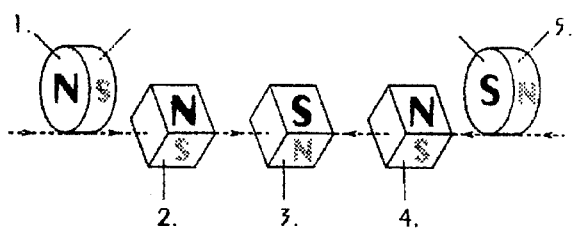
FIG. 2 is an exploded view illustrating a variation of the invention's permanent magnetic polarized configuration embodiment.

FIG. 2 is an exploded view illustrating an alternate embodiment of the invention's permanent magnet polarized configuration embodiment shown in FIG. 7. Side disc permanent magnet embodiment, element 1, South magnet polar surface embodiment marked by letter S, is shown with a directional arrow denoting the location of attachment at a fight angle by the magnetic attraction embodiment to rectangular permanent magnet embodiment, element 2 North pole embodiment marked by the letter N. Permanent magnet embodiment, element 2 North Pole embodiment, is shown with an arrow denoting the location of attachment by magnetic attraction to rectangular permanent magnet embodiment, element 3 South pole embodiment marked by the letter S. Permanent magnet embodiment, element 3 South Pole embodiment, is shown with an arrow denoting the location of attachment by magnetic attraction to rectangular permanent magnet embodiment, element 4 North Pole embodiment marked with the letter N. Permanent magnet embodiment, element 4 North Pole surface, is shown with a directional arrow denoting the location of attachment at a right angle by magnetic attraction to side disc permanent magnet embodiment, element 5 South magnet polar surface embodiment marked by the letter S. Permanent magnet embodiments, element 2, 3, and 4, magnet polar surfaces support the invention's receiving cradle embodiment, see FIG. 7, element 6.

FIG. 3 is a side outline view of the FIG. 1, the invention's flexible polarized configuration embodiment, shown without the outer housing embodiment. Element 1 and element 2 are permanent magnet embodiments attached at fight angles to the ends of the flexible polarized configuration embodiment, element 4. These two fight angle magnet embodiments act as a magnetic connector embodiment. Element 3 illustrates, in hidden line perspective, this magnetic connector embodiment in the locked position. Element 5 is the receiving cradle embodiment used to hold the saw blade cutting edges, element 6, in position. This receiving cradle embodiment is attached to the polar surface of the permanent magnet embodiments element 7 through dement 23 and the magnetic flexible joint embodiments, element 24 through element 37. The flexible magnetic joint embodiments are shown in greater detail in FIGS. 4, 5, and 6.

Figure 4:
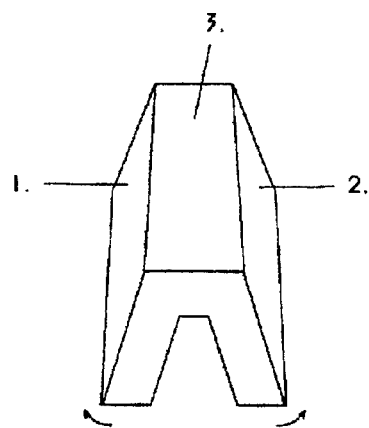
FIG. 4 is a diagonal top view of the invention's magnetic flexible joint embodiment in expanded position.

FIG. 4 is a diagonal top view illustrating a variation of the invention's magnetic flexible joint embodiment. The magnetic flexible joint comprises a suitable material including plastic implanted with ferrite magnetic oxides. These magnetic joint embodiments are conductors of the permanent magnetic field saturation action lines of force embodiment. Element 1 and element 2 are rectangular shaped flexible arm embodiments used to attach the permanent magnet embodiments by adhesive to the flexible polarized configuration embodiment. Element 1 and element 2 flexible arm embodiments have arrows showing the direction of expanding movement. The flexible arm embodiment, element 3, surface area is used to support the invention's receiving cradle embodiment shown in FIG. 3, element 5.

Figure 5:
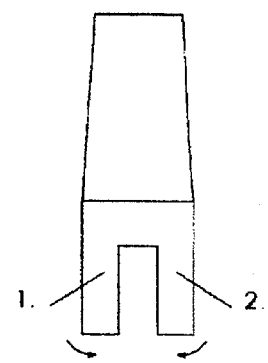
FIG. 5 is a diagonal top view of the invention's magnetic flexible joint embodiment in normal position.

FIG. 5 is a diagonal top view of the invention's magnetic flexible joint embodiment shown in from FIG. 3 and FIG. 4 with a flexible arm embodiment, element 1 and element 2 in the non-expanded position.

Figure 6:
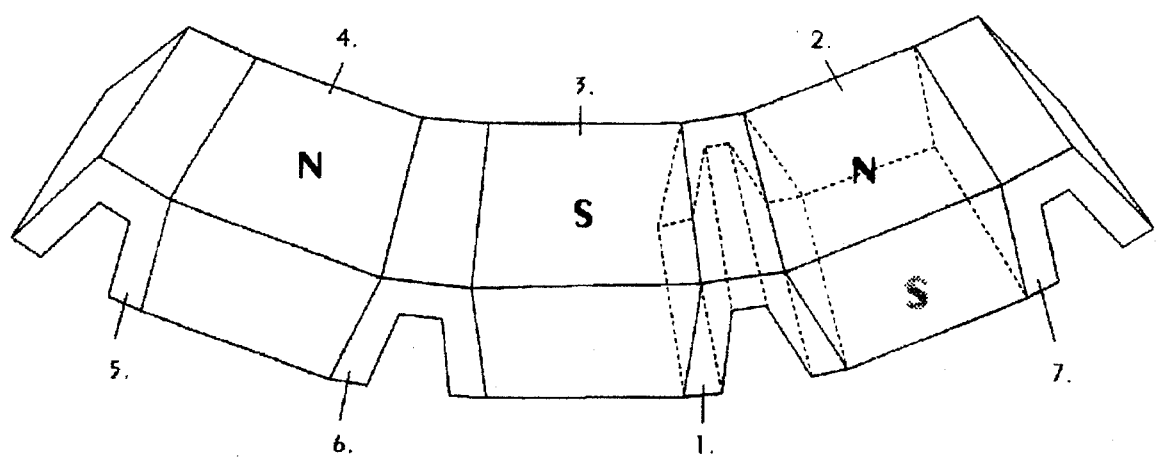
FIG. 6 is a diagonal top view of a cutaway section of the invention's flexible preferred embodiments.

FIG. 6 illustrates a diagonal top view of a cutaway section of the flexible permanent magnet polarized configuration embodiment shown in FIG. 1 and FIG. 3. Element 1 shows in hidden line perspective the magnetic joint's flexible arm embodiments, attached to opposite charged magnetic polar surfaces of permanent magnet embodiment, element 2 and permanent magnet embodiment element 3. The charge of the magnet polar surfaces are identified by the letter S for South magnetic pole and the letter N for North magnetic pole. Elements 2, 3, and 4, are permanent magnet embodiments. Elements 1, 5, 6, and 7 are magnetic joint embodiments.

FIG. 7 is a diagonal front view illustrating the invention's permanent magnet rigid polarized configuration preferred embodiments. Permanent magnet embodiments, element 1 through element 5, also shown in the FIG. 2 exploded view, comprises the invention's polarized configuration embodiment. The permanent magnet embodiments, element 1 through element 5, have their magnet polar surface charge identified by the letter N for North pole embodiments and the letter S for South pole embodiments. The polarized configuration embodiment forms a receiving cradle receptacle embodiment, element 6. The receiving cradle embodiment comprises two cutting edge guide embodiments, element 7 and element 8, attached to permanent magnet embodiments, element 2 through element 4.

Figure 8:
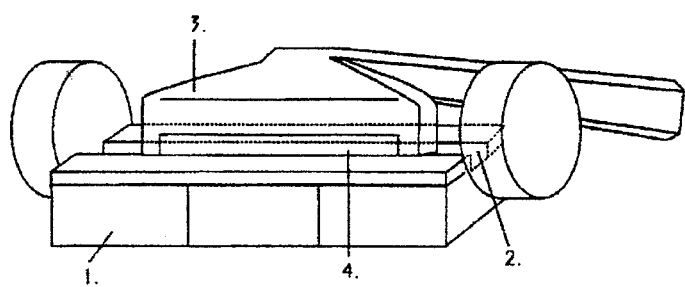
FIG. 8 is a diagonal front view of a safety razor shaving head within the invention's receiving cradle preferred embodiments.

FIG. 8 illustrates a diagonal front view of a safety razor, element 3, undergoing the invention's permanent magnetic field saturation action embodiment. The safety razor blade cutting edge, element 4, is positioned in the receiving cradle embodiment, element 2. The receiving cradle embodiment comprises an open placement area located within the permanent magnet polarized configuration embodiment, element 1.

Figure 9:
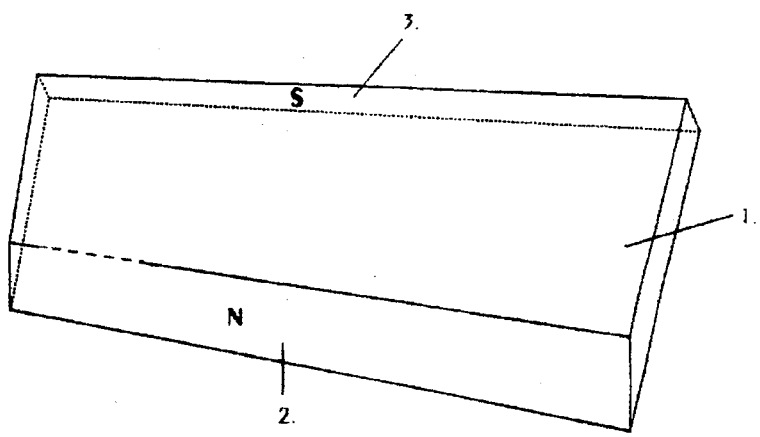
FIG. 9 is a diagonal top view of the invention's magnetic razor blade preferred embodiments.

FIG. 9 illustrates a diagonal top view of the invention's magnetic razor blade embodiment comprising a magnetic pole blade cutting edge embodiment. Element 1 is a thin flexible rectangular sheet of ferromagnetic steel comprising two oppositely charged magnetic polar surfaces. Element 2 comprises a magnetic North pole blade cutting edge embodiment marked with the letter N. Element 3 comprises a magnetic South pole blade edge embodiment marked with the letter S. This South pole charged polar surface embodiment, element 3, comprises the entire narrow longitudinal side of the magnetic razor blade embodiment which is the side opposite of the magnetic pole blade cutting edge embodiment, element 2.

FIG. 10 comprises a conventional twin blade razor. Element 1 is a slender grip handle embodiment attached to element 2, a contoured shaving head comprising two magnetic razor blade embodiments, element 3 and element 4. The magnetic razor blade embodiment, element 3, has an extended magnetic pole blade cutting edge embodiment, element 5. The magnetic razor blade embodiment, element 4, has an extended magnetic pole blade cutting edge embodiment, element 6. These two magnetic pole blade cutting edge embodiments, element 5 and element 6, have oppositely charged magnetic polar shaving surface embodiments.

FIG. 11 is a side view illustrating the invention's magnetic keeper embodiment. Element 1 is a grip handle of a conventional twin blade safety razor illustrated in hidden line perspective. Element 2 is a twin blade safety razor shaving head illustrated in hidden line perspective. Element 3 is a side, end view of a conventional magnetic razor blade embodiment comprising a magnetic pole blade cutting edge embodiment, element 4, with an oppositely charged magnetic pole surface embodiment, element 5. Element 6 is a side end view of the second magnetic razor blade embodiment comprising a magnetic pole blade cutting edge embodiment, element 7, with an oppositely charged magnetic pole surface embodiment, element 8. Element 9 illustrates, in hidden line perspective, the invention's magnetic keeper embodiment comprising the invisible magnetic field circuit embodiment flowing between oppositely charged magnetic pole blade cutting edge embodiments, element 4 and element 7. Element 10 illustrates, in hidden line perspective, the magnetic keeper embodiment comprising the magnetic field circuit embodiment flowing between oppositely charged magnetic pole embodiments, element 5 and element 8.

Figure 12:
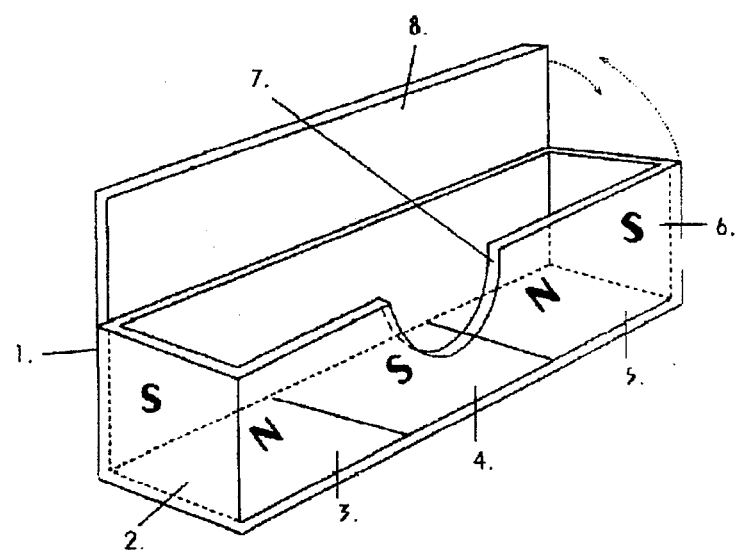
FIG. 12 is a diagonal top view of another alternative of the invention's preferred embodiments for use with safety razor shaving heads.

FIG. 12 is a diagonal top view of an alternative embodiment of the invention's safety razor blade cutting edge preservation housing device comprising a removable plastic housing embodiment for enclosing safety razor shaving head blade cutting edges undergoing the invention's permanent magnetic field saturation action embodiment. The rectangular box housing, element 1, comprises permanent magnet embodiments, element 2 through element 6, with magnet polar surface charge embodiments identified by the letter N for North pole embodiments and the letter S for South pole embodiments. Permanent magnetic embodiments, elements 2 through element 6, comprise the invention's polarized configuration embodiment. Element 7 comprises a collar embodiment for holding safety razor grip handles, see FIG. 13, element 2. The housing embodiment comprises a top cover embodiment, element 8, that closes over a safety razor shaving head. Arrows indicate the top cover embodiment's, element 8, direction of movement.

Figure 13:
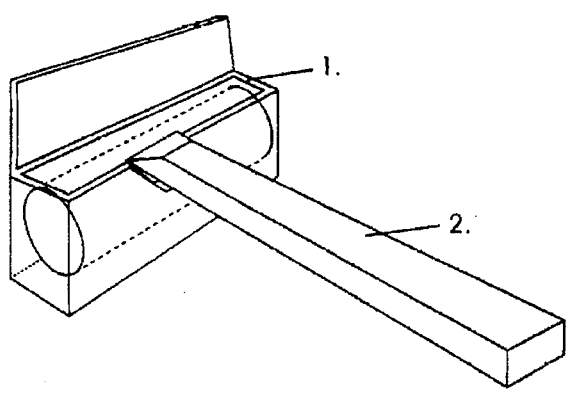
FIG. 13 is a diagonal top view of the alternative of the invention's preferred embodiments in use with a safety razor shaving head.

FIG. 13 is a diagonal top view of the invention's safety razor shaving head removable housing embodiment illustrated in greater detail in FIG. 12. Element 1 comprises the housing embodiment with open top containing a safety razor shaving head, element 2, undergoing the invention's permanent magnetic field saturation action embodiment.

Figure 14:
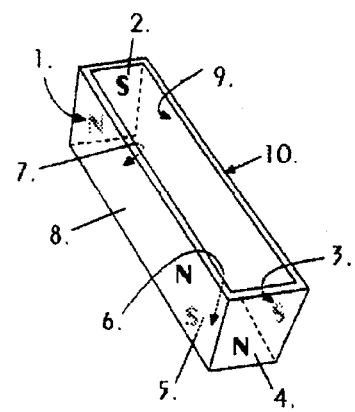
FIG. 14 is a diagonal top view of another alternative of the invention's preferred embodiments for use with a safety razor shaving head.
Figure 15:
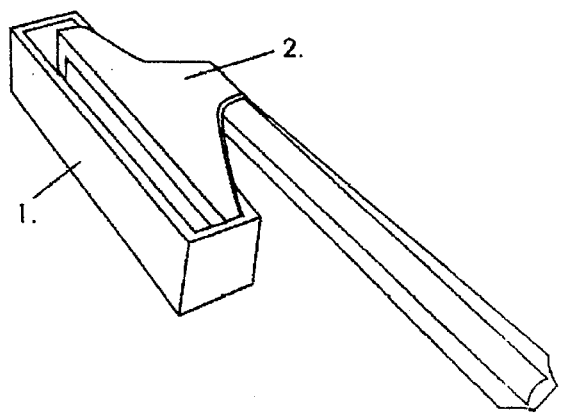
FIG. 15 is a diagonal top view of another alternative of the invention's preferred embodiments in use with a safety razor shaving head.

FIG. 14 is a diagonal top view of an alternative embodiment of the invention's removable plastic magnetic housing embodiment comprising a five side housing constructed of plastic material implanted with ferrite magnetic oxide permanent magnet embodiments. This removable housing embodiment comprises the invention's alternate permanent magnet polarized configuration embodiment. A pictorial view of this magnetic housing embodiment is illustrated in FIG. 15, element 1, shown attached to the shaving head of safety razor FIG. 15, element 2. Permanent magnet polar surfaces embodiment, FIG. 14, element 1 through element 10, have their magnetic pole charge identified with the letter S for the South pole embodiments and the letter N for the North pole embodiments.

FIG. 15 is a diagonal top view of the invention's alternative safety razor shaving head permanent magnet polarized configuration housing embodiment, element 1, comprising a thin plastic permanent magnet apparatus attached to the shaving head of safety razor, element 2, while the blade cutting edges undergo the invention's permanent magnetic field saturation action embodiment.

Figure 16:
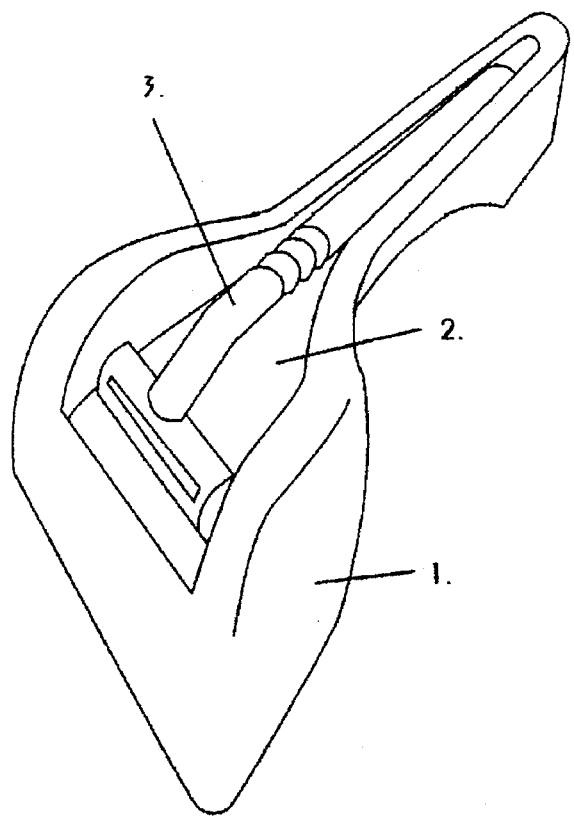
FIG. 16 is a pictorial diagonal view of the invention's safety razor blade cutting edge preservation device embodiment.

FIG. 16 is a pictorial diagonal view of the invention's safety razor blade cutting edge preservation device. Element 1 comprises a contour shaped support body with an upper recessed storage area, element 2, used for storage of conventional safety razor shaving devices, see element 3. The support body, element 1, comprises an impact resistant non-ferrous material that is impervious to water damage, cleans easily and houses the preferred embodiments of the invention. The recessed area embodiment, element 2, comprises an easy access storage area for safety razor shaving devices undergoing the invention's permanent magnetic field saturation action embodiment.

Figure 17:
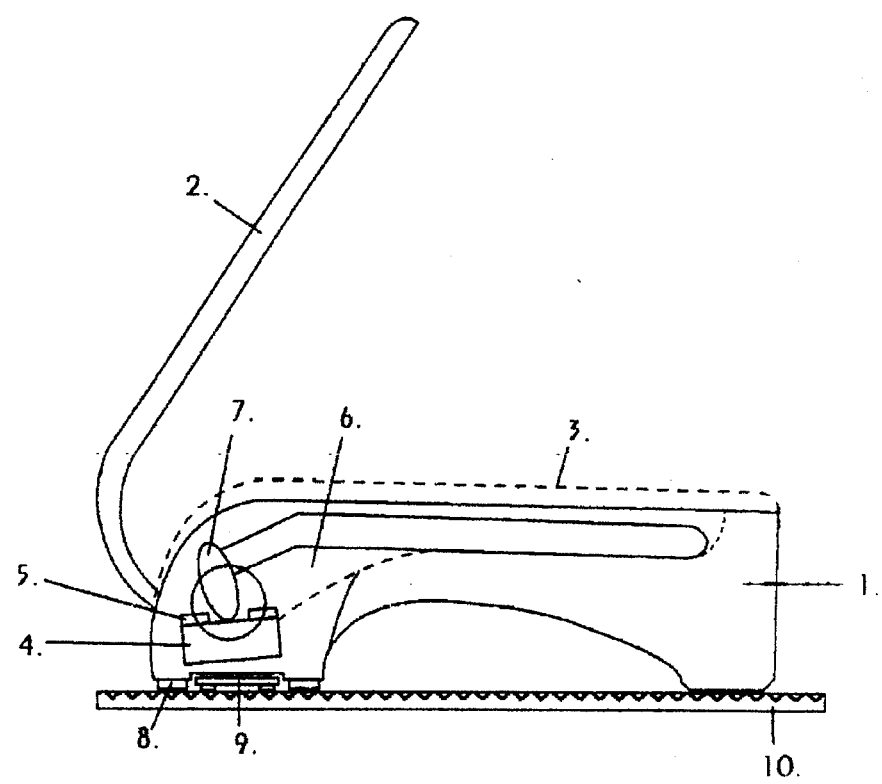
FIG. 17 is a side view in outline and hidden line perspective of the preferred embodiments of the invention's safety razor blade cutting edge preservation device.

FIG. 17 is a side outline view of the invention's safety razor blade cutting edge preservation device preferred embodiments. Element 1 comprises the contour shaped support body embodiment. Element 2 comprises a clear top cover unit embodiment that protects the safety razor, element 7, from splashing water when the invention is used in the bath and shower areas. Element 3 shows in hidden line perspective the clear cover embodiment in a closed position. Element 4 illustrates the invention's permanent magnet polarized configuration embodiment shown in FIGS. 2, 7, and 8. The invention's polarized configuration embodiment, element 4, comprises an angled tilt of approximately 15 degrees that accepts the angled shaving head of safety razor, element 7. Element 5 illustrates the invention's receiving cradle embodiment used to store blade cutting edges that are undergoing the invention's permanent magnetic field saturation action embodiment. Element 6 illustrates the recessed storage area for safety razor shaving device, element 7. Element 8 illustrates a magnetic wall mount storage embodiment comprising a thin recessed rectangular shaped area in close proximity centered directly below, element 4, the permanent magnet polarized configuration embodiment. Element 8 is used to mount the invention's contour shaped support body embodiment, element 1, by magnetic attraction to element 9, a magnetic mounting plate embodiment attached by adhesives to a vertical wall surface embodiment, element 10. The magnetic wall plate, element 9, is shown in greater detail in FIG. 19.

Figure 18:
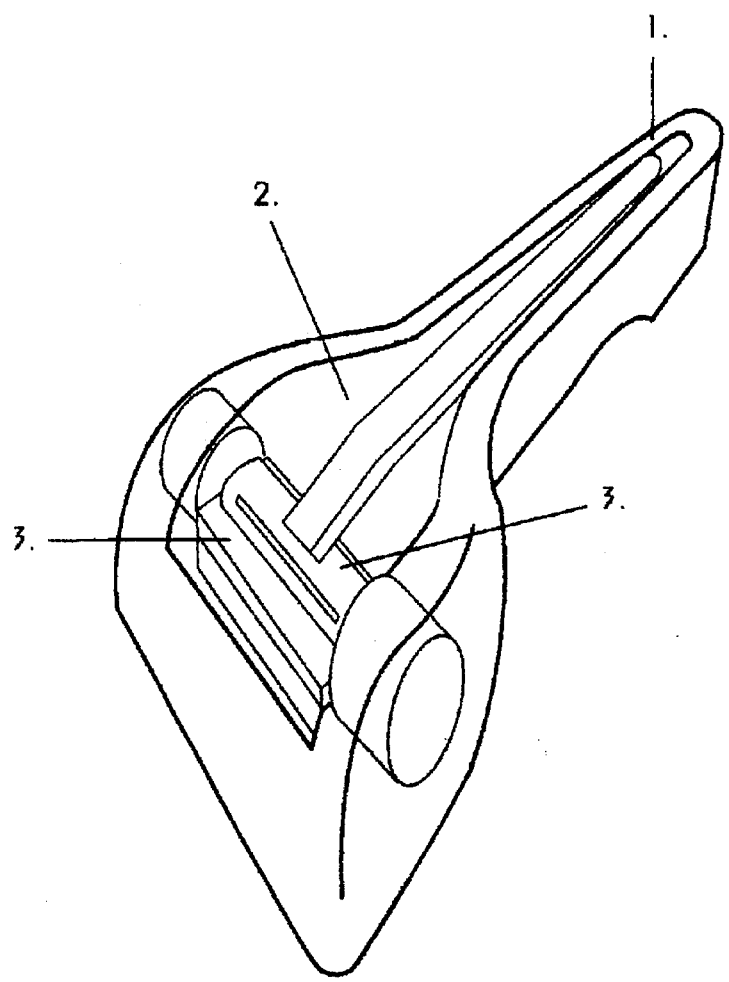
FIG. 18 is a cutaway diagonal view of the permanent magnet preferred embodiments of the invention's safety razor blade cutting edge preservation device.

FIG. 18 is a cutaway diagonal view of the invention's safety razor blade cutting edge device embodiments. Element 1 comprises the contour shaped support body embodiment. Element 2 comprises the recessed storage area for safety razor shaving devices. Element 3 illustrates the invention's permanent magnet polarized configuration embodiment. Element 4 illustrates a safety razor shaving head with blade cutting edge embodiments undergoing the invention's permanent magnetic field saturation action embodiment.

Figure 19:
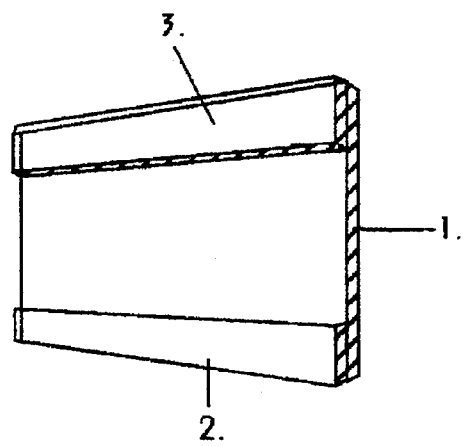
FIG. 19 is a diagonal view of the invention's magnetic wall mount preferred embodiments.

FIG. 19 is a diagonal view of the invention's magnetic wall plate mounting embodiment. Element 1 comprises a thin rectangular sheet of ferromagnetic steel material that secures by magnetic attraction the invention's contour shaped support body in a vertical position, see FIG. 17, element 9. The magnet wall plate embodiment, element 1, is formed to be inserted into the invention's wall mount recessed area embodiment, see FIG. 17, element 8. This recessed area embodiment is in close proximity to the invention's permanent magnet embodiments, FIG. 17, element 4, and hold the support body, FIG. 17, element 1, in place by magnetic attraction from these permanent magnet embodiments. Element 1, the magnetic wall plate embodiment, is attached to the vertical wall, element 10, by adhesive tape embodiments, element 2 and element 3.

Having now described and shown particular preferred embodiments of the invention, various alternate modifications may be apparent to those skilled in the art and therefore is not intended that the invention be limited to the details thereof and departures may be made therefrom within the spirit and scope of the claims.

Claims to be failed at a later date.
What is claimed is:

1. A permanent magnet apparatus in combination with a blade cutting edge, said magnet apparatus comprising;
    a first permanent magnet polarities surface having two opposite ends;
    a second permanent magnet pole surface situated at one of said ends;
    a third permanent magnet pole surface situated at the other of said ends;
    said first magnet polarities surface comprises a magnetic surface having means for attaching alternate charge permanent magnet poles situated end-to-end;
    said means for attaching said alternate charge permanent magnet poles end-to-end comprises flexible magnetic joints;
    said flexible magnetic joint comprises adhesive ferromagnetic polar conducting material bridging alternate charge magnet pole surfaces;
    said first jointed magnet polarities surface attached to said second and third magnet polar surfaces defines a receptacle; said blade cutting edge being held in said receptacle;
    said cutting edge having it's length situated in close proximity to said first jointed magnet polarities surface having said second and third magnet polar surfaces being held in proximity to said length of said cutting edge.

2. The apparatus of claim 1, wherein the first permanent magnet jointed polarities surface with the second and third permanent magnet polar surfaces are enclosed within a plastic housing.

3. A method for extending the life of a blade cutting edge comprising;
    attaching second and third permanent magnets together with magnetic joints to a first permanent magnet jointed polarities surface such that polar surfaces of the second and third permanent magnet surfaces are situated at opposite ends of said first jointed polarities surfaces, said first jointed polarities surface comprising alternate charge magnet poles situated end-to-end having adhesive flexible magnetic joints bridging said alternate charge magnet poles;
    providing a blade cutting edge;
    placing said cutting edge in close proximity to the polarities surface of said first jointed polarities surface with the length of the blade cutting edge running between said polar surfaces of the second and third permanent magnets.

4. The apparatus of claim 1, wherein the charges of said first permanent magnet jointed polarities surface comprises alternate charge magnet pole surfaces situated end-to-end having jointed magnetic North, jointed magnetic South, jointed magnetic North, jointed magnetic South, wholly iterative between said second and third permanent magnet polar surfaces.

5. A magnet apparatus in combination with a blade cutting edge, said magnet apparatus comprising;
    a first permanent magnet polarities surface having two opposite ends;
    a second permanent magnet pole surface being situated at one of said ends;
    a third permanent magnet pole surface being situated at the other of said ends;
    said first magnet polarities surface defines a permanent magnet surface formed by alternate charge magnet poles, said magnet poles situated end-to-end;
    said first magnet polarities surface being situated having the same polarity magnet poles situated at ends of said surface;
    said second and third magnet polar surfaces having the same polarity and being of an opposite polarity to said magnet poles situated as ends of said first magnet polarities surface;
    said first magnet polarities surface attached to said second and third magnet polar surfaces comprises a receptacle;
    said blade cutting edge being held in said receptacle;
    said cutting edge having its length situated in close proximity to said first magnet polarities surface having said second and third magnet polar surfaces being held in proximity to opposite ends of said length of said cutting edge.

6. The apparatus of claim 5, wherein the first permanent magnet polarities surface with the second and third permanent magnet polar surfaces being partially enclosed within a wooden housing.

7. The apparatus of claim 5, wherein the first permanent magnet polarities surface with the second and third permanent magnet polar surfaces defining a receptacle being enclosed within a plastic housing comprising;
   a contoured support body with a recessed storage area in combination with said magnet apparatus having means for situating a safety razor incorporating an exposed blade cutting edge within said magnet apparatus receptacle;
   said means for situating said safety razor blade exposed cutting edges, within said magnet apparatus receptacle comprise magnetic attraction;
   an opening top cover of said recessed area comprising a means for preventing water spray from entering said magnet apparatus receptacle;
   a fastened magnetic mount having means for securing said housing in fixed position;
   said means for securing said housing comprises magnetic attraction between said mount and said magnet apparatus of claim 5.

8. The apparatus of claim 5, wherein the charge of said first permanent magnet polarities surface end-to-end comprises a magnetic South, a magnetic North, and a magnetic South.

9. A method for extending the life of a blade cutting edge comprising;
   attaching second and third permanent magnets to a first permanent magnet polarities surface such that polar surfaces of the second and third permanent magnets are situated at opposite ends of said first permanent magnet polarities surface having alternate charge magnet poles, said alternate charge magnet poles situated end-to-end, wherein said charge of said ends of the first permanent magnet polarities surface being opposite to the charge of said polar surfaces of the second and third permanent magnets;
   providing a blade cutting edge;
   placing said cutting edge of the blade in close proximity to the polarities surface of said first permanent magnet polarities surface, with the length of the blade cutting edge running between said polar surfaces of the second and third permanent magnets.

10. The method of claim 5, wherein attaching of the second and third permanent magnets to the first permanent magnet polarities surface comprises; attaching magnetic North pole surfaces of the second and third magnets to the opposite ends of the first permanent magnet polarities surface; incorporating the first permanent magnet polarities surface comprising end-to-end a magnetic South Pole surface, a magnetic North pole surface, and a magnetic South pole surface.

11. A permanent magnet apparatus in combination with a blade having a cutting edge, said magnet apparatus comprising;
   a first permanent magnet pole surface having two opposite ends and two opposite sides;
   a second permanent magnet pole surface being situated at one of said ends;
   a third permanent magnet pole surface being situated at the other of said ends;
   a fourth permanent magnet pole surface situated at one of said sides;
   a fifth permanent magnet pole surface situated at the other of said sides;
   said second and third polar surfaces having the same polarity and being an opposite polarity to said first pole surface;
   said fourth and fifth polar surfaces having the same polarity and being of an opposite polarity to said first pole surface;
   said first, second, third, fourth, and fifth polar surfaces defines a receptacle;
   said blade cutting edge being held in said receptacle;
   said cutting edge having its length situated in close proximity to said first pole surface and each of said second and third polar surfaces being in close proximity to said ends of said length of said cutting edge, and each of said fourth and fifth polar surfaces being in close proximity to said sides of said length of said cutting edge.

12. The apparatus of claim 11, wherein the first, second, third, fourth, and fifth permanent magnet polar surface forming said receptacle of claim 11 being situated in a five side compartment enclosed within a housing said receptacle compartment having an open area sixth side opposite said first permanent magnet pole surface being in proximity to said second, third, fourth, and fifth permanent magnet polar surfaces.

13. The apparatus of claim 11, wherein the charge of said first permanent magnet pole surface is magnetic North.

14. A method for extending the life of a blade cutting edge comprising;
   attaching second, third, fourth, and fifth permanent magnets to a first permanent magnet pole surface such that polar surfaces of the second and third magnet surfaces are located at opposite ends of said first permanent magnet pole surface, wherein said charge of said second and third magnet polar surfaces are opposite to the charge of said first magnet pole surface, said fourth and fifth magnet surfaces are located at opposite sides of said first permanent magnet pole surface, wherein the charge of said fourth and fifth magnet polar surfaces are opposite to the charge of said first magnet pole surface;
   providing a blade cutting edge;
   placing said cutting edge of the blade in close proximity to the polar surface of said first magnet pole surface with the length of said blade cutting edge running between said polar surfaces of said second and third magnets and in proximity to said polar surfaces of said fourth and fifth magnets.

15. The method of claim 11, wherein attaching of the second and third permanent magnets to the first permanent magnet comprises attaching magnetic South pole surfaces of the second and third magnets to opposite ends of a magnetic North pole surface of the first magnet, wherein attaching of the fourth and fifth permanent magnets to the first permanent magnet includes attaching magnetic South pole surfaces of the fourth and fifth magnets to opposite sides of a magnetic North pole surface of the first magnet.

16. A magnet apparatus in combination with a blade having a cutting edge, said magnet apparatus comprising;
   a first permanent magnet pole surface having two opposite ends, two opposite sides, and opposite top;
   a second permanent magnet pole surface being situated at one of said ends;
   a third permanent magnet pole surface being situated at the other of said ends;
   a fourth permanent magnet pole surface being situated at one of said sides;

a fifth permanent magnet pole surface being situated at the other of said sides;

a sixth permanent magnet pole surface being situated above and opposite said first magnet pole surface;

said sixth pole surface in proximity to said ends, said sides, and being situated above and opposite said first pole surface;

said second and third polar surfaces having the same polarity being of an opposite polarity to said first pole surface;

said fourth and fifth polar surfaces having the same polarity and being of an opposite polarity to said first pole surface;

said sixth pole surface being the same polarity to said first pole surface;

said first, second, third, fourth, fifth, and sixth polar surfaces comprising a receptacle;

said sixth pole surface comprises an opening top of said magnetic apparatus receptacle;

said blade cutting edge being held in said receptacle;

said cutting edge having its length situated in close proximity to said first pole surface and each of said second and third polar surface being in proximity to said ends of said length of said cutting edge and each of said fourth and fifth polar surfaces being in proximity to sides of said length of said cutting edge, and said sixth pole surface being opposite said first pole surface and in proximity above said length of said blade cutting edge.

17. A method for extending the life of a blade cutting edge comprising;

attaching second, third, fourth, and fifth permanent magnets to a first permanent magnet pole surface forming a receptacle such that polar surfaces of the second and third magnet surfaces are located at opposite ends of said first magnet surface, wherein said charge of said second, and third magnet polar surfaces are opposite to the charge of said first magnet pole surface, said fourth and fifth magnet surfaces are located at opposite sides of said first magnet pole surface, wherein the charges of said fourth and fifth magnet polar surfaces are opposite to the charge of said first magnet pole surface and attaching a sixth permanent magnet pole surface comprising an opening top, positioned opposite said first magnet pole surface and proximate said second, third, fourth, and fifth magnet surfaces, wherein the charge of said sixth magnet pole surface is the same charge as said first magnet pole surface;

providing a blade cutting edge;

placing said cutting edge of the blade in close proximity to the pole surface of said first permanent magnet surface with the length of said blade cutting edge running between said polar surfaces of said second and third permanent magnets, and the sides of said blade cutting edge situated between said polar surfaces of said fourth and fifth permanent magnets, and said sixth permanent magnet pole surface positioned above said blade length and said sixth permanent magnet pole surface positioned opposite said first permanent magnet pole surface.

18. The method of claim 16, wherein attaching of the second and third permanent magnets to the first permanent magnet includes attaching magnetic South pole surfaces of the second and third magnets to opposite ends of a magnetic North pole surface of the first magnet; wherein attaching of the fourth and fifth permanent magnets to the first magnet includes attaching magnetic South pole surfaces of the fourth and fifth magnets to the opposite side of a magnetic North pole surface of the first magnet; wherein attaching of the sixth permanent magnet North pole surface proximate the second, third, fourth, and fifth magnets, magnetic South pole surface includes attaching the magnetic North pole surface of the sixth magnet, above and opposite the magnetic North pole surface of the first magnet.

19. The apparatus of claim 16, wherein the first, second, third, fourth, fifth, and sixth permanent magnet polar surfaces being situated in a six wall compartment defining a receptacle; said receptacle having with an opening top comprising sixth magnet pole surface, said sixth magnet pole surface being positioned opposite said first magnet pole surface.

20. The apparatus of claim 16, wherein the charge of said first permanent magnet pole surface is magnetic North.

21. A magnet apparatus in combination with a safety razor shaving head having exposed blade cutting edges, said magnet apparatus comprising;

a first permanent magnet pole razor blade cutting edge;

a second opposite charge permanent magnet pole razor blade cutting edge;

said first and second opposite charge magnet pole blade cutting edges having said cutting edges situated in parallel close proximity comprising a magnetic keeper;

said magnetic keeper defines a magnetic attraction circuit between said first and second opposite charge magnet pole blade cutting edges;

said magnetic attraction circuit comprises magnetic field lines of force flowing between said first and second opposite charge magnet pole blade cutting edges;

said first and second magnet pole razor blade cutting edges being exposed and situated in said safety razor shaving head.

22. A method for extending the life of a razor blade cutting edge comprising;

a safety razor shaving head situating first and second razor blades with exposed opposite charge magnet pole blade cutting edges in parallel close proximity having said magnetic keeper circuit of claim 21 flowing between said opposite charge magnet pole blade cutting edges of said first and second razor blades.

23. The apparatus of claim 21, wherein the charge of said first magnet pole razor blade cutting edge surface comprises magnetic North, having said second magnet pole razor blade cutting edge surface comprising a charge of magnetic South.

* * * * *